H. HESS.
ANTIFRICTION BEARING.
APPLICATION FILED NOV. 30, 1908.

929,762.

Patented Aug. 3, 1909.

Witnesses:

Inventor
HENRY HESS.
By his Attorneys
Rogers & Kennedy

UNITED STATES PATENT OFFICE.

HENRY HESS, OF WAWA, PENNSYLVANIA.

ANTIFRICTION-BEARING.

No. 929,762.   Specification of Letters Patent.   Patented Aug. 3, 1909.

Application filed November 30, 1908. Serial No. 465,085.

*To all whom it may concern:*

Be it known that I, HENRY HESS, a citizen of the United States, residing at Wawa, in the county of Delaware and State of Pennsylvania, have invented certain new and useful Improvements in Antifriction-Bearings, of which the following is a specification, reference being had therein to the accompanying drawing.

This invention relates to mountings for antifriction bearings, and has reference more particularly to a device for firmly securing the bearing to its support. Devices for this purpose have been constructed in the form of a contractile conical bushing encircling the shaft or support, and provided at one end with screw threads to receive a nut, the bushing being in turn encircled by the inner casing element of the bearing, the bore of which is coned to fit the bushing, so that by screwing the nut up against the casing element, the latter is forced up the incline of the bushing and acts to bind the latter on the shaft and effect a firm and rigid connection of the parts. Such a construction is disclosed in a patent issued to me on the 23rd day of April, 1907, No. 851,419.

It is the aim of the present invention to avoid the necessity of forming the core of the casing element of the bearing, conical, as was the case in the construction referred to, and to adapt the device for use in connection with bearings in which the bore of the casing element is "straight", or truly cylindrical, and the invention consists in combining with a contractile bushing adapted to encircle the shaft or support, and having its exterior surface coned or inclined, an expansible bushing encircling the same and formed with a conical bore and cylindrical exterior, said expansible bushing being threaded at one end, a nut encircling the threaded end of the bushing and adapted to engage the contractile bushing, and an anti-friction bearing including an inner casing element encircling the expansible bushing; whereby when the nut is screwed up, it will, by engaging the contractile bushing, move the other bushing along the conical surface of the contractile bushing, thereby contracting the latter on the shaft and expanding the former within the casing element.

The invention consists also in the details of construction and combination of parts hereinafter described and claimed.

Figure 1:
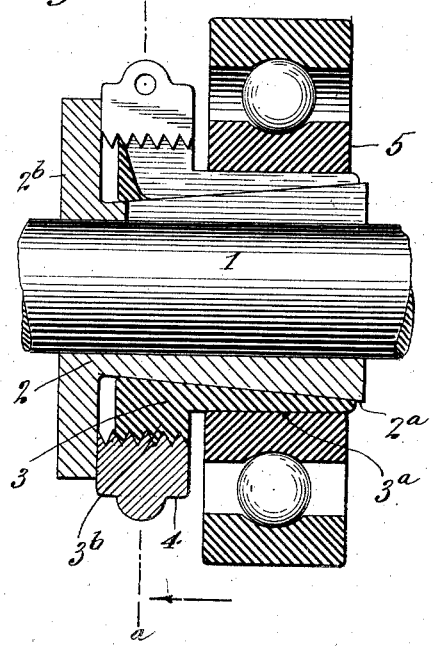
Figure 2:
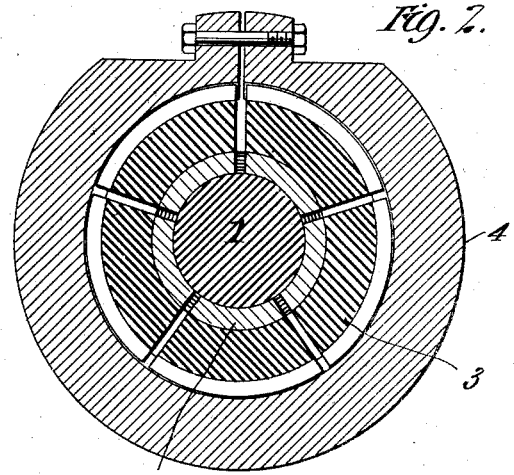
Figure 3:
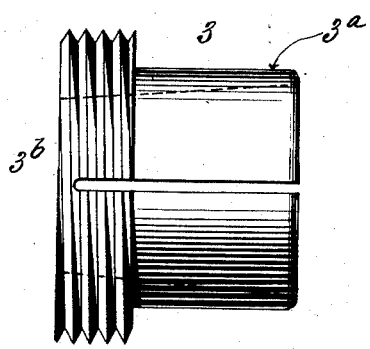
Figure 4:
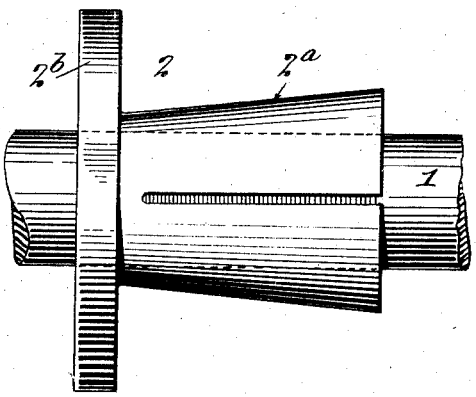

In the accompanying drawings: Figure 1 is a longitudinal sectional elevation showing a supporting shaft and bearing mounted thereon in accordance with my invention. Fig. 2 is a cross-section on the line $a$—$a$ of the preceding figure. Fig. 3 is a side elevation of the contractile bushing removed. Fig. 4 is a similar view of the expansible bushing removed.

Referring to the drawings: 1 represents a support in the form of a shaft to which the bearing is to be applied.

2 represents a contractile bushing encircling the shaft and provided with an exterior conical supporting surface $2^a$, and having on one end a lateral annular flange $2^b$ forming an abutment, for the purpose presently described.

3 represents an expansible bushing, provided with a conical bore surrounding the supporting surface of the contractile bushing, and having a "straight" or cylindrical external supporting surface $3^a$ to receive the antifriction bearing, the end of said expansible bushing being provided with a laterally extending annular flange $3^b$.

4 represents a nut encircling the threaded flange $3^b$, and adapted when screwed up thereon to bear against the abutment $2^b$ of the contractile bushing; and 5 represents the inner casing element of an anti-friction bearing, formed with a "straight" cylindrical bore to fit the cylindrical surface $3^a$ of the expansible bushing. As a result of this construction and arrangement, it will be seen that when the nut is screwed up on the threaded flange of the expansible bushing, it will engage the abutment on the contractile bushing and will urge the former along the conical or inclined supporting surface of the latter, thereby contracting the bushing 2 on the shaft, and at the same time slightly expanding the other bushing within the core of the casing element, with the result that the parts will be clamped firmly together in fixed relations and bound tightly on the shaft. By reason of the fact that the thread for the nut is formed in a flange on the expansible bushing, I am enabled to make this thread coarse and deep, without enlarging the diameter of the bushing, which enlargement would necessitate a bearing larger than necessary to support the load to be sustained, and inasmuch as in the assembling of the parts, the casing element may be passed over the unthreaded end of the expansible bushing, the height of the flange is not limited by the diameter of the bore of the casing element, as it would be if the latter had to be passed over the threaded end of the bushing, hence the flange may be of any height within reasonable limits, so that a thread coarse and deep enough may be employed to permit the parts to be bound with the greatest firmness and rigidity without danger of stripping the thread. It will be observed further, that I am enabled to employ, by the construction shown, a bearing in which the casing element which encircles the shaft, is formed with a cylindrical or "straight" bore, and at the same time bind the bearing on the shaft by a wedging action of the coöperating bushings, thereby avoiding the expense and inconvenience attendant upon a special construction of the inner casing element, and this without increasing the size of the bearing beyond that necessary to support the load.

The two bushings may be made respectively contractile and expansible by forming therein longitudinal slots extending from one end and terminating near the opposite end, thereby dividing them into segmental connected sections; or, as an alternative construction, the slots may be extended entirely through the bushings, thereby forming separable segmental sections.

I prefer to split the nut 4 at one side and to connect the divided ends by a clamping bolt 6, so that after the nut has been screwed up and the parts have been firmly clamped to the shaft at the desired point, the nut may be prevented from working loose by tightening up the clamping bolt.

I desire to be understood that my invention is not limited to any specific form or arrangement of the parts, except in so far as such limitations are specified in the claims.

In order to permit the contractile bushing to be assembled within the expansible bushing as shown in Fig. 1, the parts of the contractile bushing, separated by the longitudinal slots therein, are forced together by initial compression sufficiently to permit the end of the same to pass through the bore of the expansible bushing, it being understood that the width of the slots are such that sufficient reduction in diameter may take place to permit this to be done.

Having thus described my invention, what I claim and desire to secure by Letters Patent of the United States is as follows:

1. In combination with a support, a contractile conical bushing thereon, an expansible bushing surrounding the same and formed with a supporting portion having a cylindrical exterior, a nut screwed on the expansible bushing and adapted to engage the other bushing, and an anti-friction bearing including an inner casing element encircling the supporting portion of the expansible bushing.

2. In combination with a support, a contractile bushing thereon provided with a conical supporting portion, an annular flange or abutment on said bushing, an expansible bushing having a supporting portion formed with a cylindrical outer surface and a conical bore surrounding the contractile bushing, a nut on the expansible bushing adapted to engage said abutment, and an anti-friction bearing, including an inner casing element provided with a cylindrical bore encircling the supporting portion of the expansible bushing.

3. In combination with a support, a contractile bushing thereon formed with an exterior conical supporting surface and encircling the support, an abutment on the end of said bushing, an expansible bushing formed with a conical bore encircling the contractile bushing and having a cylindrical exterior supporting portion, an annular threaded flange on the end of the expansible bushing, a nut on the flange adapted to engage the abutment on the contractile bushing, and an anti-friction bearing, including an inner casing element formed with a cylindrical bore encircling the expansible bushing.

In testimony whereof I have affixed my signature in presence of two witnesses.

HENRY HESS.

Witnesses:
MARY McCALLA,
NETTIE L. HAHN.